(12) United States Patent
Crain et al.

(10) Patent No.: US 7,669,813 B2
(45) Date of Patent: Mar. 2, 2010

(54) MULTIPLE FUNCTION GEOMATICS POLE SUPPORT DEVICE

(75) Inventors: Stephen B. Crain, Cape Girardeau, MO (US); Christopher T. Moore, Creal Springs, IL (US)

(73) Assignee: SECO Manufacturing Company, Inc., Sunnyvale, CA (US)

( * ) Notice: Subject to any disclaimer, the term of this patent is extended or adjusted under 35 U.S.C. 154(b) by 1247 days.

(21) Appl. No.: 11/032,410

(22) Filed: Jan. 10, 2005

(65) Prior Publication Data

US 2005/0151035 A1 Jul. 14, 2005

Related U.S. Application Data

(60) Provisional application No. 60/536,468, filed on Jan. 13, 2004.

(51) Int. Cl.
*F16M 11/32* (2006.01)

(52) U.S. Cl. .................. 248/163.1; 248/518; 248/530

(58) Field of Classification Search .................. 248/515, 248/518, 520, 163.1, 316.7, 530, 538, 127, 248/176.2, 105; 43/21.2; 33/293, 295, 296
See application file for complete search history.

(56) References Cited

U.S. PATENT DOCUMENTS

| 633,251 | A | | 9/1899 | Stone | |
|---|---|---|---|---|---|
| 1,729,531 | A | * | 9/1929 | Wolever | ..................... 248/105 |
| 1,837,637 | A | * | 12/1931 | Walberg | ..................... 84/421 |
| 2,245,901 | A | | 6/1941 | Chaskin | |
| 2,469,859 | A | * | 5/1949 | Charbeneau | ................. 248/106 |
| 2,614,779 | A | * | 10/1952 | Peterson et. al. | ......... 248/117.2 |
| 2,835,975 | A | | 5/1958 | Zimmerman | |
| 2,873,531 | A | | 2/1959 | Chick | |
| 3,077,035 | A | | 2/1963 | Hackney | |
| 3,195,234 | A | | 7/1965 | Glidden et al. | |
| 3,239,176 | A | | 3/1966 | Johnson | |
| 3,286,969 | A | * | 11/1966 | Frescobaldi | ................. 248/688 |
| D212,770 | S | | 11/1968 | Egan | |
| 3,471,987 | A | | 10/1969 | Yelsma | |
| 3,530,611 | A | * | 9/1970 | Britt | ............................... 43/17 |
| 3,570,130 | A | * | 3/1971 | Boehm | ........................ 33/295 |
| D225,981 | S | | 1/1973 | Brown | |
| 3,855,710 | A | * | 12/1974 | Lunden | ....................... 33/295 |
| 3,922,921 | A | * | 12/1975 | Woo | .......................... 73/866.5 |
| D239,592 | S | | 4/1976 | Anderson | |
| D241,314 | S | | 9/1976 | Hug | |
| D248,347 | S | | 7/1978 | McCollum | |
| 4,136,848 | A | * | 1/1979 | McCollum | ............... 248/316.7 |
| 4,192,076 | A | | 3/1980 | Hall | |
| 4,208,946 | A | | 6/1980 | Van Sickle | |
| 4,270,721 | A | | 6/1981 | Mainor, Jr. | |
| 4,290,207 | A | * | 9/1981 | Browning et al. | ............. 33/295 |
| 4,339,880 | A | * | 7/1982 | Hall | ............................. 33/293 |
| 4,356,637 | A | | 11/1982 | Hall | |

(Continued)

OTHER PUBLICATIONS

Hold-A-Pole Pole Support Device with rubber band for use on tripod head-5 photographs on sheet (admitted prior art).

(Continued)

*Primary Examiner*—Korie Chan
(74) *Attorney, Agent, or Firm*—Senniger Powers LLP

(57) ABSTRACT

A geomatics pole support comprises a body and pole engaging members for connecting the support to a geomatics pole so that the body is retained by the pole engaging members projecting generally laterally outwardly from a longitudinal axis of the pole. The body further includes a terrain engagement surface adapted to engage a ground surface and to hold at least a portion of the pole in a stable position out of contact with the ground surface.

17 Claims, 10 Drawing Sheets

U.S. PATENT DOCUMENTS

| | | | |
|---|---|---|---|
| D276,272 S | 11/1984 | Weissenburger | |
| 4,543,729 A * | 10/1985 | Holbrook | 33/293 |
| D289,732 S | 5/1987 | Jason | |
| D295,724 S | 5/1988 | Shioda | |
| 4,803,784 A * | 2/1989 | Miller | 33/293 |
| 4,830,328 A * | 5/1989 | Takach et al. | 361/685 |
| 4,854,069 A * | 8/1989 | Smith et al. | 43/21.2 |
| 4,879,816 A * | 11/1989 | Sierk | 33/295 |
| D306,553 S | 3/1990 | Rumpel | |
| D319,575 S | 9/1991 | Young | |
| 5,152,494 A * | 10/1992 | Frunzar | 248/513 |
| D332,882 S | 2/1993 | Graves | |
| D335,251 S | 5/1993 | Nilsson | |
| 5,222,708 A | 6/1993 | McLellan | |
| 5,400,516 A | 3/1995 | Kellenberger | |
| 5,400,996 A * | 3/1995 | Drish | 248/520 |
| D360,053 S | 7/1995 | Wilborn, II et al. | |
| 5,442,866 A | 8/1995 | Woods | |
| 5,454,473 A | 10/1995 | Hennessey | |
| 5,454,931 A | 10/1995 | Lauve, Jr. | |
| D374,042 S | 9/1996 | Guenette | |
| D375,890 S | 11/1996 | Takai | |
| D376,973 S | 12/1996 | Brown | |
| 5,614,918 A | 3/1997 | Dinardo et al. | |
| 5,749,549 A | 5/1998 | Ashjaee | |
| 5,769,370 A | 6/1998 | Ashjaee | |
| 5,863,021 A * | 1/1999 | Nichols | 248/229.23 |
| 5,865,406 A | 2/1999 | Teeple | |
| D417,611 S | 12/1999 | van de Lande | |
| D419,423 S | 1/2000 | Ayrest | |
| D429,023 S | 8/2000 | Hughes et al. | |
| D429,628 S | 8/2000 | Peters | |
| D435,365 S | 12/2000 | Eason et al. | |
| D438,453 S | 3/2001 | Nelson et al. | |
| D451,007 S | 11/2001 | Jones et al. | |
| D463,039 S | 9/2002 | Tseng | |
| 6,561,206 B1 * | 5/2003 | Wilkinson | 135/65 |
| D479,798 S | 9/2003 | Wall | |
| D480,291 S | 10/2003 | Sorkin | |
| D482,262 S | 11/2003 | Sorkin | |
| 6,688,566 B1 | 2/2004 | Crain et al. | |
| 2003/0226946 A1 * | 12/2003 | Liao | 248/316.7 |

OTHER PUBLICATIONS

Lo Ink Catalog Spring/Summer 2003 www.loink.com; cover Page of catalog, p. 26 Hold-A-Pole, The Pole Clamp and Alligator Tripod, p. 31 Prism Pole Adjuster.
Hayes Instrument Internet Site; True Plumb Prism Pole Adjusting Jig (admitted prior art).
Hayes Instrument Internet Site; SECO Prism Pole Adjusting Jig (admitted prior art).
Hayes Instrument Internet Site; SECO Prism Pole Bipod Prop (admitted prior art).
Hayes Instrument Internet Site; SECO Bipod Leg Clip (admitted prior art).
SECO Manufacturing Internet Site; Offset Pole-Holder Kit (admitted prior art).
Gardner Engineering Internet Site; Rod Rest (admitted prior art).

* cited by examiner

MULTIPLE FUNCTION GEOMATICS POLE SUPPORT DEVICE

CROSS REFERENCE TO RELATED APPLICATION

This application claims the benefit of U.S. Provisional Application No. 60/536,468, filed Jan. 13, 2004.

BACKGROUND OF THE INVENTION

This invention relates generally to devices which support various surveying and geomatics poles, and more particularly to a support suitable for steading poles during measurements, permitting calibration verification of leveling indication vials, and holding a portion of the pole out of contact with the ground.

During a typical survey, multiple and various measurements are often taken requiring varies degrees of accuracies. For example, measurements of property boundaries may require a greater degree of accuracy than measurements locating the position of fire hydrants, yet both measurements may be performed in the same survey using the same geomatics target device. In order to meet the specific accuracy or speed efficiency requirements of a particular measurement, survey crew members may be required to change the support holding a geomatics target device. The target devices include prismatic retroreflectors, global positioning system receivers and optical targets.

Commonly, various types of geomatics poles are used to support geomatic target devices. These geomatics poles typically are fitted with a ground engaging point on a base end, permitting precise indication of a ground point. To provide desired line of sight clearances, the target device is typically located on the apex of the pole, opposite of the base end. A level indication vial is commonly located at a point along the length of the pole to facilitate vertical collimation of the pole over the ground point in a process known as plumbing. Geomatics poles, which may be either fixed length or telescopic, are capable of retaining an established length throughout multiple measurements. Known and constant target heights save measurement calculation time. As a result, measurements can be obtained much faster with geomatics poles than with other supporting devices, such as tripods.

However, geomatics poles have several disadvantages. For one, the level indication vials of these poles often lose their accuracy calibration, which may cause inaccurate measurements. Because of this deficiency, level vial accuracy must be verified periodically. Many prior art level vial checking devices are dedicated only to the function of checking level vials and require being fixed to a wall. Thus, these wall mounted level vial checking devices are not available for use in the field.

For some measurements, geomatics poles may be handheld in vertical collimation over a ground point. Positioning a geomatics pole positioning by hand provides a fast and convenient method of taking measurements. However, the practice of handheld positioning of geomatics poles also has disadvantages. One of these disadvantages is that precise and extended retention of pole position is very difficult. Therefore, measurements taken with handheld poles are less precise than supported ones. Another disadvantage with handheld poles becomes evident when a surveyor must perform a task not involving the pole, such as installing a monument or making a note. In these instances, the pole is often laid directly on the ground, subjecting the pole and target to damage and malfunction as a result of ground borne debris (e.g., sand, mud).

A number of dedicated prior art devices are offered to steady or support geomatics poles, which permit more precise measurement observations to be taken. Many of these prior art pole support devices provide supporting legs in the form of bipods or tripods. One version of a geomatics pole supporting bipod is illustrated in U.S. Pat. No. 3,570,130 to Boehm. A version of a dedicated geomatics pole tripod is illustrated in U.S. Pat. No. 5,749,549 to Ashjaee. These pole support devices have disadvantages, among which is that they only perform one function.

In some instances, tripod stands, which are typically designed to support primary instruments such as transits, theodolites and total stations, are also used to support geomatics targets. In other instances, dedicated target support tripods are used. One version of a dedicated target support tripod is illustrated in U.S. Pat. No. 3,195,234 to Glidden. While the tripods are quite stable, they also have a number of disadvantages. For instance, in the case of instrumentation tripods, adaptors (commonly known as tribrachs) are required to provide a connective interface between the target and the tripod. Additionally, these tripods are slow and difficult to set up with targets because the procedures for establishing precise vertical collimation, and determination of height of targets, are quite time consuming. Dedicated target tripods have an additional disadvantage of performing only one function. The disadvantages of using tripods for geomatic target supports often limit their use to those measurements requiring great accuracy.

Standard (i.e., nondedicated) tripods may be adapted to support geomatics poles so that the target devices can remain on the poles, a practice which saves time. One prior art surveying tripod type pole support device is illustrated in U.S. Pat. No. 4,290,207 to Browning. These types of support devices also have many disadvantages, such as being capable of only one use; providing a pole to tripod interface. Also, the positive coupling connections found in many of these pole supports tend to inhibit free rotation of the poles, which inhibits level vial calibration confirmations. These positive connections also resist sliding the support along the pole thereby resisting gravitational forces on the pole and limiting bearing support of the point on the ground surface. Additionally, these pole supports tend to be complex in design, heavy, and expensive.

One prior art tripod type geomatics pole support, marketed under the name Hold A Pole, permits free rotation, and free sliding of the geomatics pole. However, this pole support also has disadvantages, one of which is that the captivity of the geomatics pole is rather flimsy, as the pole is retained with an elastic band. Additionally, the elastic band must be manually attached and detached when the geomatics pole is installed and removed, which is inconvenient and also requires two hands to perform. Additionally, in order to prevent friction and thus permit free sliding and rotation of the pole, the elastic band must be rather weak in design, which may cause the pole to be unstable and possibly result in inaccurate measurements. Additionally, the force of wind can critically load the elastic band allowing the geomatics pole to fall to the ground thereby subjecting the pole, the level vial and its geomatics target to damage.

In addition to taking measurements, persons performing surveys must also engage in other activities such as installing monuments or making notes. In order to free surveyors hands while engaged in activities other than measuring, geomatics equipment is often placed directly on the surface of the ground. The exposure of survey equipment to ground borne debris such as mud or sand can render the equipment inaccurate or even inoperable. Moreover, field conditions in surveying often include rough and remote terrains, and surveying equipment must often be transported by hand, so features of weight and convenience have particular importance to surveyors.

SUMMARY OF THE INVENTION

Generally, a geomatics pole support of the present invention comprises a body and pole engaging members adapted to connect the support to a geomatics pole so that the body is retained by the pole engaging members projecting generally laterally outwardly from a longitudinal axis of the pole. The body further includes a terrain engagement surface adapted to engage a ground surface and to hold at least a portion of the pole in a stable position out of contact with the ground surface.

In another aspect of the present invention, a geomatics pole support generally comprises a body having a first end and a second end. Arms extend from the first end of the body. Engaging members are mounted on each of the arms at a location remote from the body. The engaging members are adapted to grip the geomatics pole to simultaneously retain the body in a position projecting laterally outwardly from the pole and permit the support to slide lengthwise of the pole.

In still another aspect of the present invention, a geomatics pole support generally comprises a body having a first end and a second end, and arms extending from the first end of the body. An engaging members is mounted on each of the arms at a location remote from the body. At least one of the engaging members is formed for snap-on engagement with the geomatics pole to simultaneously retain the body in a position projecting laterally outwardly from the pole.

In a further aspect of the present invention, a supporting device capable of being erected on a ground surface in an upright position generally comprises a pole support comprising a body having a first end and a second end. The pole support is adapted to support the geomatics pole in a first position wherein at least a portion of the second end of the body is in contact with the ground surface and at least a portion of the pole is held by the pole connector in a stable position out of contact with the ground surface, and a second position wherein the pole support is connected to the supporting device and the geomatics pole capable of being held in a substantially upright position.

These and other objects and features of the present invention will be in part apparent and in part pointed out hereinafter.

DETAILED DESCRIPTION OF PREFERRED EMBODIMENTS

Figure 1:
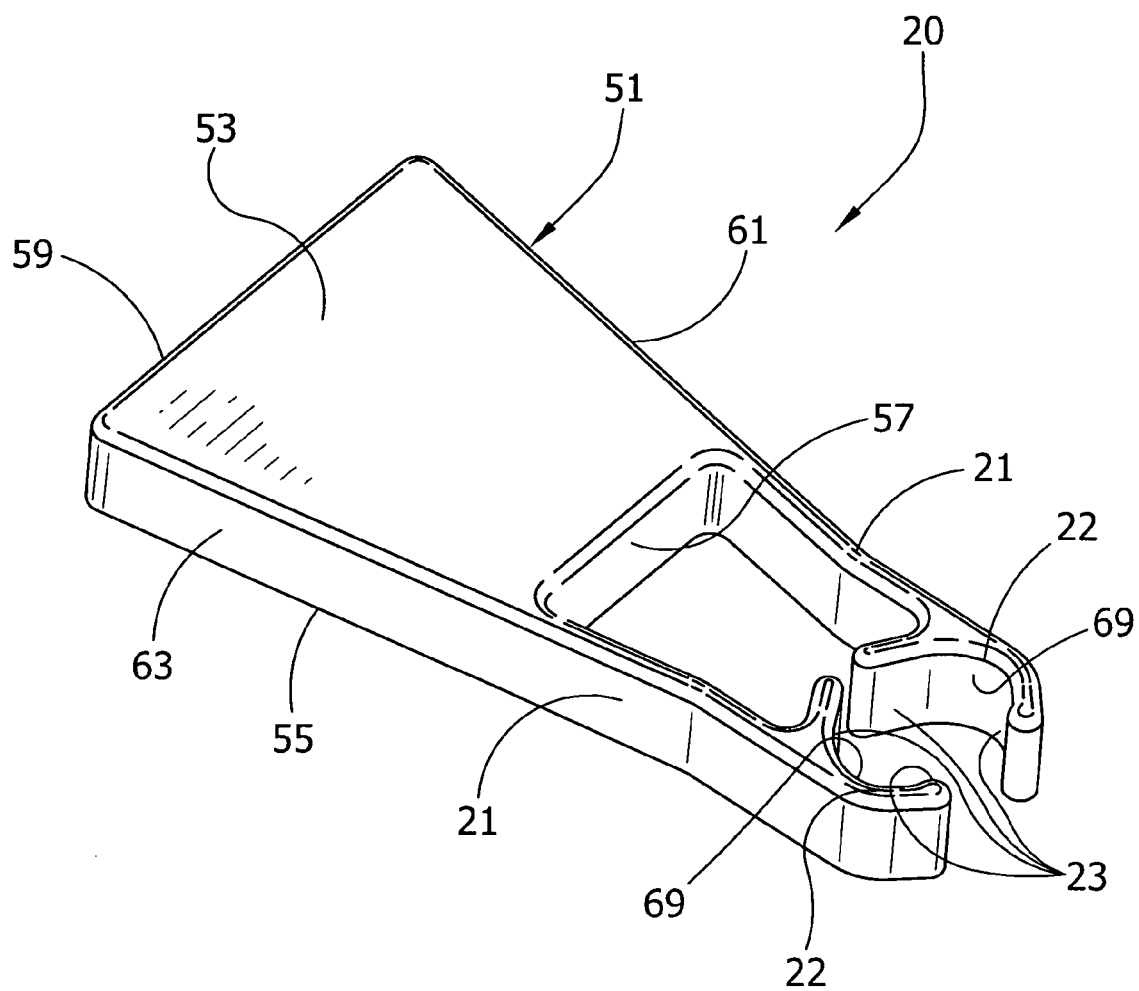
FIG. 1 is a perspective of a geomatics pole support device.
Figure 2:
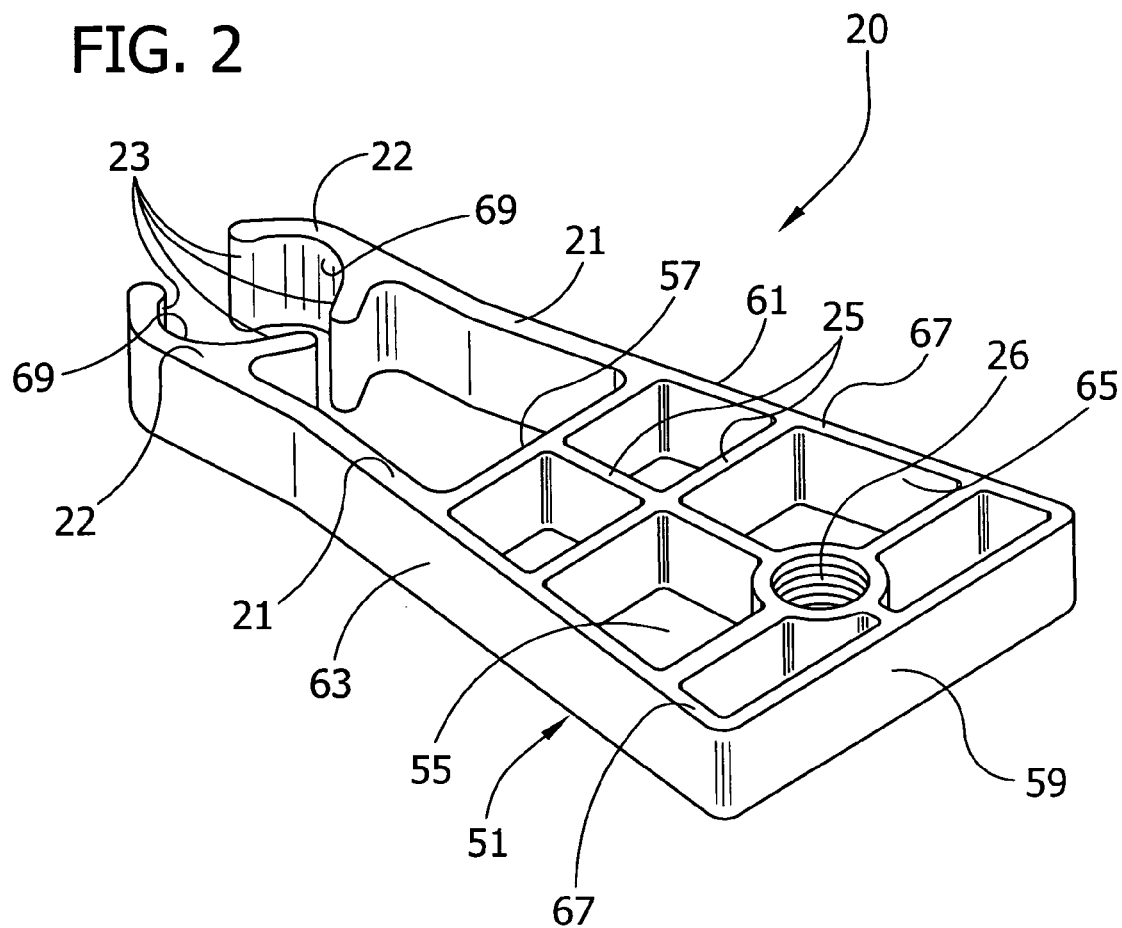
FIG. 2 is a perspective of the underside of the pole support device.

The geomatics pole support device, generally indicated at 20, of the present invention is shown in FIGS. 1 and 2. The pole support device 20 comprises a body, generally indicated at 51, and bifurcated jaw support arms 21 extending outwardly from the body. In the illustrated embodiment, the body 51 has a top 53, a bottom 55 and four sides 57, 59, 61, 63. The top 53 of the body 51 has a generally flat surface with beveled edges along its periphery. The four sides 57, 59, 61, 63 of the body, which generally form an isosceles trapezoid, extend downward (as the device is viewed in FIG. 1) from the periphery of the top 53 of the body 51. Accordingly, the body 51 has a front 57, a back 59, a right side 61 and a left side 63. The front and back 57, 59 of the body 51 are generally parallel but have different lengths. The back 59 is longer than the front 57. The right and left sides 63, 61 have approximately the same lengths but are not parallel. It is understood that the body 51 of the support may have different configurations (i.e., size, shape) without departing from the scope of this invention.

As shown in FIG. 2, the bottom 55 of the body 51 includes four interior side surfaces 65 that collectively define a partitioned cavity. A rim 67 extends between interior side surfaces 65 and the sides 57, 59, 61, 63 of the body 51. In addition, a matrix of structural support ribs 25 extend between the interior surfaces 65. While it is contemplated that the pole support device 20 may have any number of ribs 25 or no ribs at all, in the illustrated embodiment, two lateral ribs and one longitudinal rib extend through the cavity.

Figure 3:
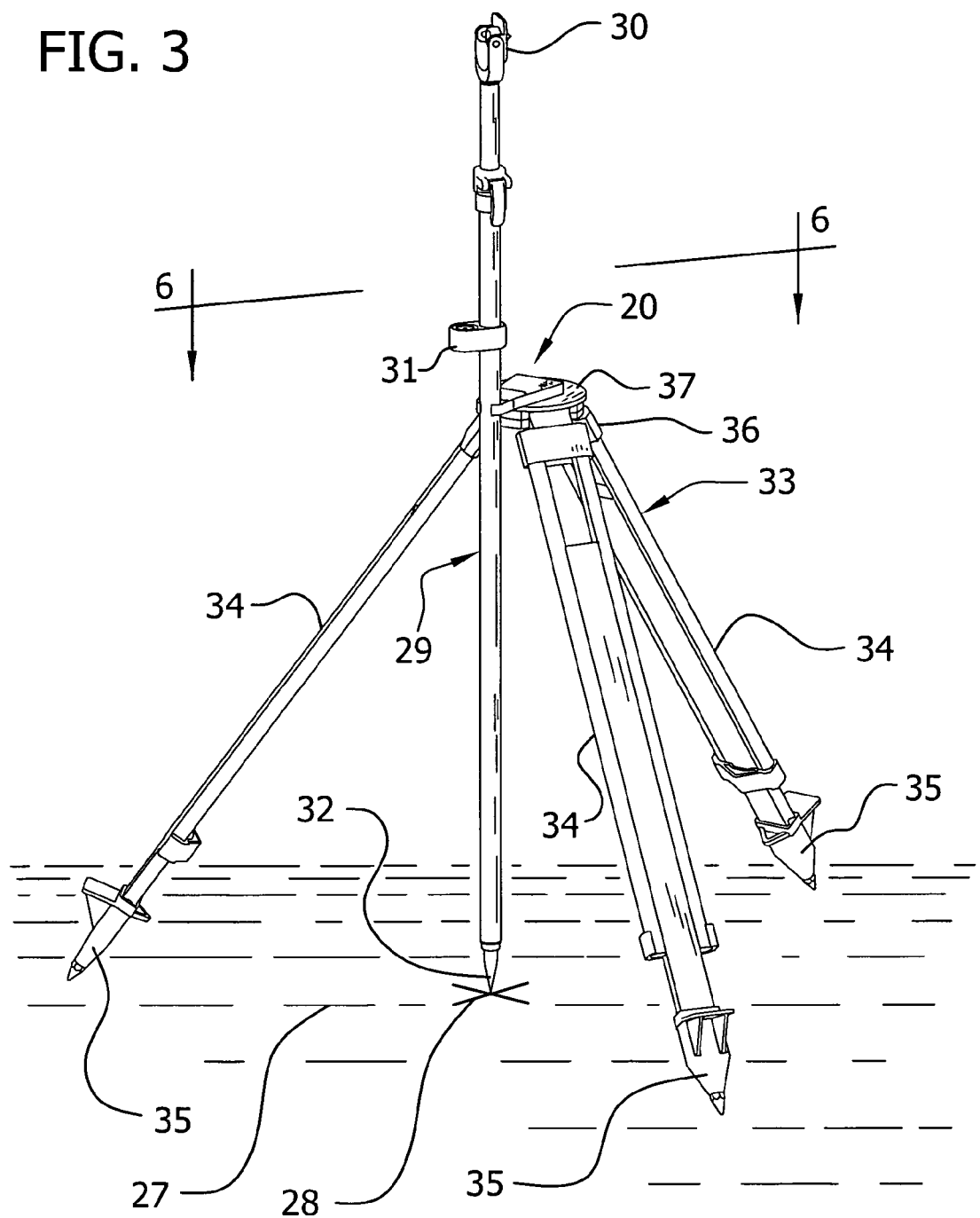
FIG. 3 is a perspective of a vertically positioned geomatics pole, pole support device and tripod.
Figure 8:
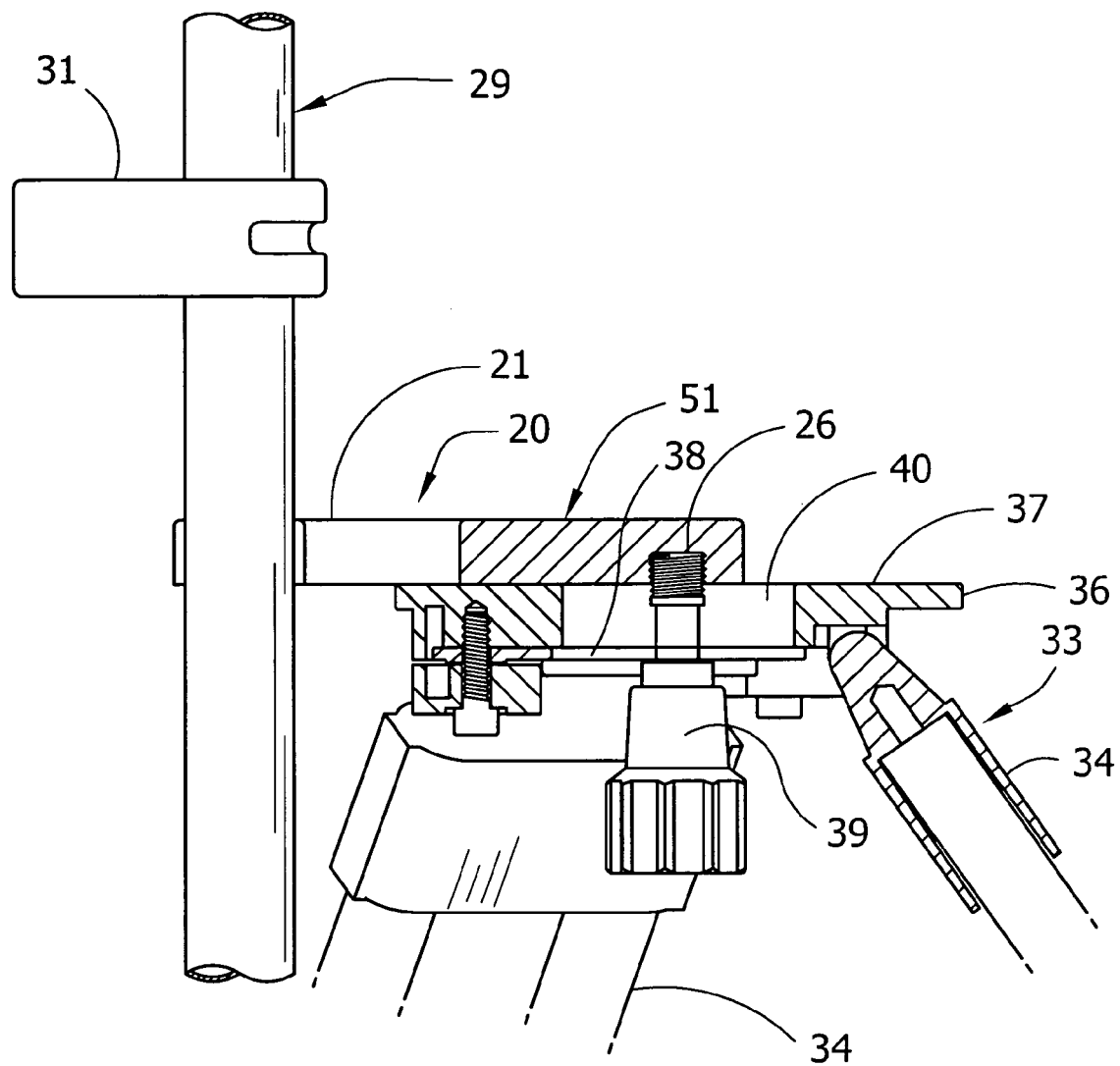
FIG. 8 is a section taken along line 8-8 of FIG. 4, showing the pole support device attached to the tripod.

The bottom 55 of the body 51 also contains a socket 26 (FIG. 2) that is capable of mating with a support, such as a surveying tripod, indicated generally at 33 (FIG. 3). Referring again to FIG. 2, The socket 26 is approximately equidistant from the right and left sides 61, 63 but is closer to the back 59 than the front 57. The illustrated socket 26 is shown as being threaded and adapted for receiving a threaded male coupling, such as a bell screw 39 of a tripod (FIG. 8). Typically, the threads of the socket 26 are of a nominal ⅝ of an inch in diameter and pitched at 11 threads per inch, which is an accepted standard of the geomatics industry. It is understood that the pole support device 20 can be attached to a support using other methods within the scope of the present invention.

Figure 9:
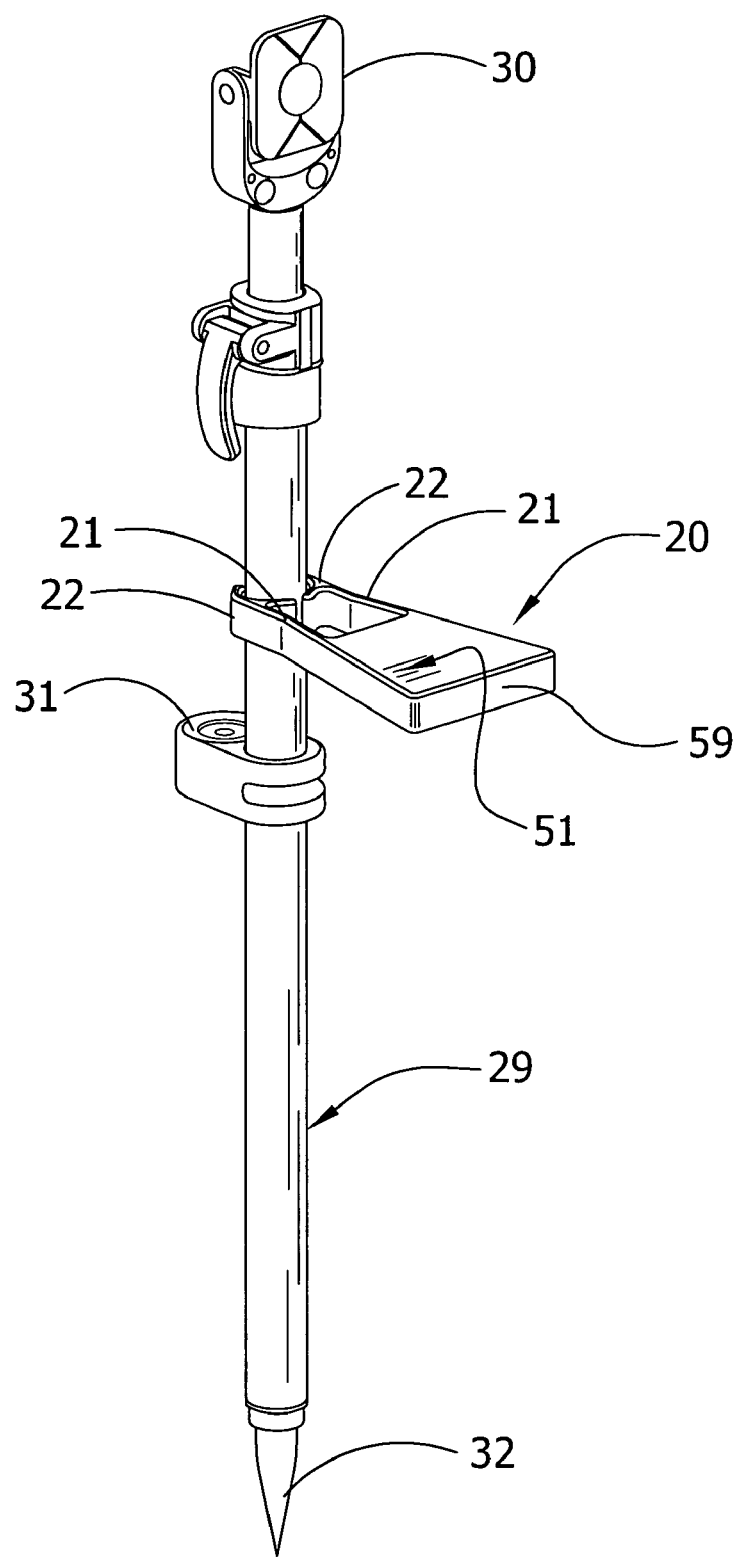
FIG. 9 is a perspective of the pole support device mounted in a cantilevered projection on the geomatics pole.

As illustrated in FIGS. 1 and 2, the arms 21 of the pole support device 20 extend outwardly from the front 57 of the body 51. Located at an end of each of the arms 21 are pole engagement jaws 22 (broadly, "pole engaging members"), which are capable of releasable connection along the length a pole. Collectively in the embodiment shown, the arms 21 and engagement jaws 22 form a "pole connector". In the illustrated embodiment, the pole is a geomatics target support pole indicated generally at 29 in FIG. 3. The jaws 22 are resiliently deformable thereby providing a snap connection. Each of the jaws 22 contain a bulbous portion 69 with a surface having points 23 of pole engagement (see FIG. 7). The points 23 provide rigid lateral support to the geomatics target support pole 29 while permitting free sliding and rotational movement of the supported pole. Thus, the jaws 22 of the support 20 form a pole connection capable of rigidly retaining the support in perpendicular appendage, as shown in FIG. 9, to the length of the pole 29.

The support 20 is molded of a high lubricity, polymeric material, such as Nylon 66, into a one-piece structure. Other materials and constructions, including multi-component constructions are envisioned.

In a first mode of use, as illustrated in FIG. 3, pole support device 20 is used to support the geomatics target pole 29 mounting a retroprism 30 in a vertical position. Other suitable geomatics target devices may be mounted on the pole 29 within the scope of the present invention. The pole support device 20 is coupled to a standard surveying tripod 33. Using a level indication vial 31 mounted on the pole 29, the pole can be pivoted into a position of precise collimation above a ground surface point of measurement 28. In this mode of use, the ground engagement feet 35 of legs 34 of the surveying tripod 33 form a rigid, stable structure above a ground terrain surface 27.

Figure 4:
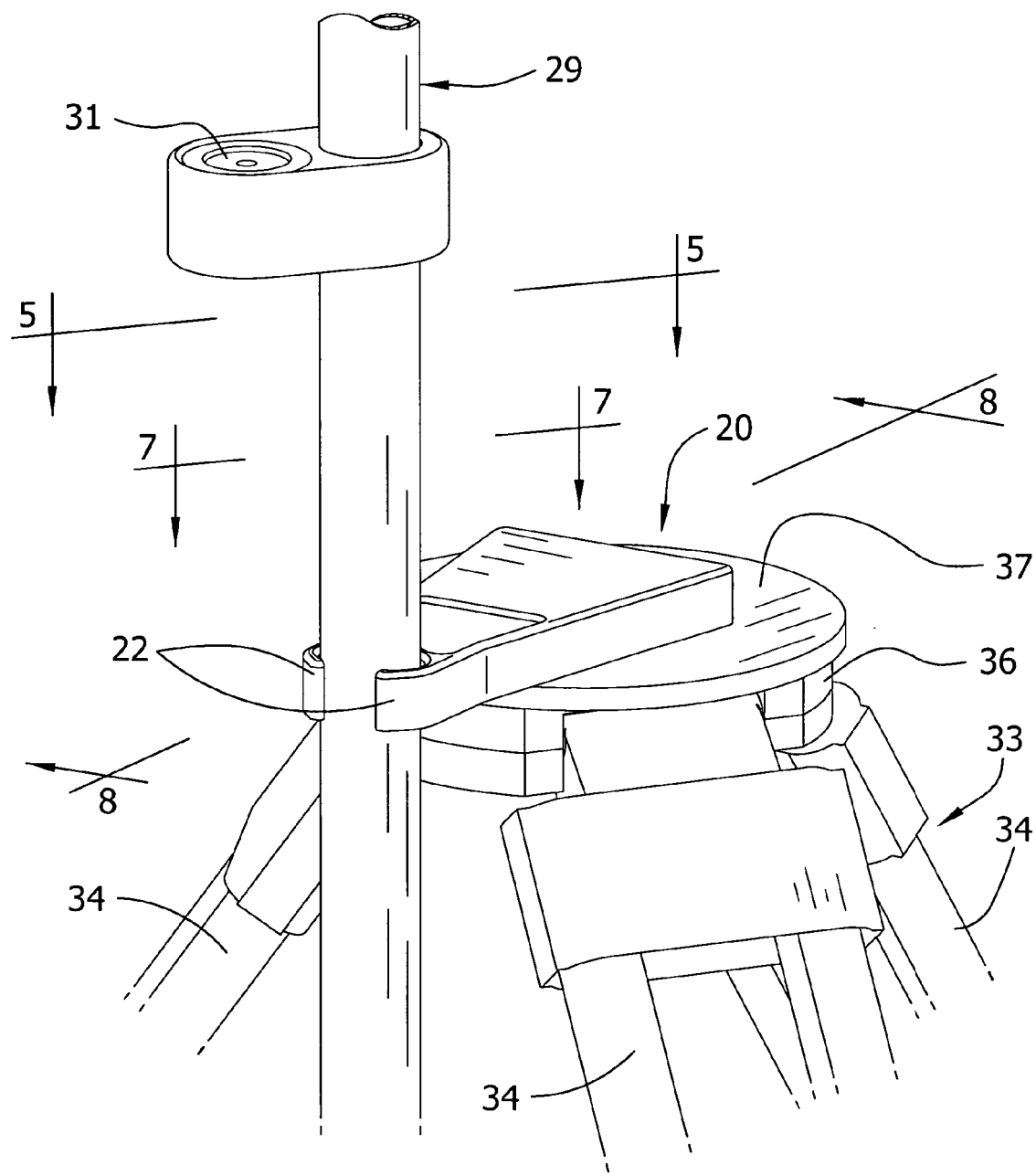
FIG. 4 is an enlarged fragment of FIG. 3, showing the pole support device attached to the tripod and a segment of the geomatics pole.
Figure 5:
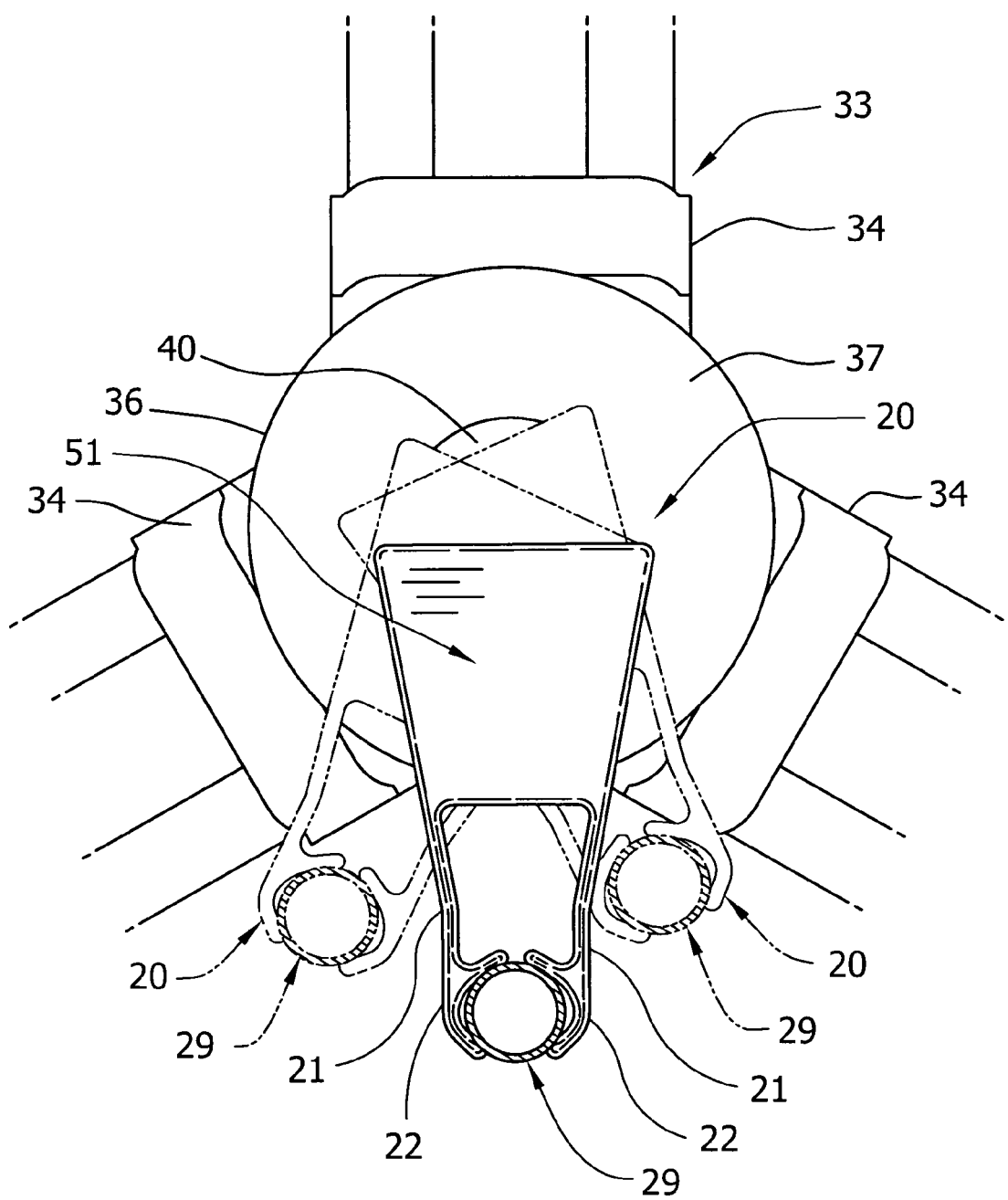
FIG. 5 is a section taken along line 5-5 of FIG. 4 illustrating adjustable movement of the pole support device and pole in phantom.

FIG. 4 is an enlarged fragment of FIG. 3 and more clearly illustrates the support device 20 connected to the geomatics pole 29 and the tripod 33. The support 20 is positioned on a surface plane 37 of tripod head 36. As illustrated in FIG. 5 in phantom, the position of pole support device 20 is slidably adjustable on the planed surface 37 of the tripod head 36. As these sliding adjustments are made, the supported geomatics pole 29 held by the support 20 bears and pivots on a fulcrum formed at a point 32 resting on the surface point 28 on the ground. In this manner, the geomatics pole 29 is adjusted to a precise vertical collimation over the surface point 28.

The pole support device 20 can be secured to the tripod head 36 (FIG. 8). When mounted on the tripod, the support 20 lies on the plane surface 37 of the tripod head 36 and is secured to the tripod by the bell screw 39. Tightening of the bell screw creates compression on a bell screw retainer yoke 38 and the under surface of the pole support 20 thereby preventing movement of the pole support with respect to the tripod head 36. When compression of the bell screw 39 is relaxed, the pole support 20 is permitted to slide both laterally and pivotally within a tripod head aperture 40 thereby facilitating lateral and pivotal adjustment of supported geomatics pole being supported by the pole support 20.

Figure 6:
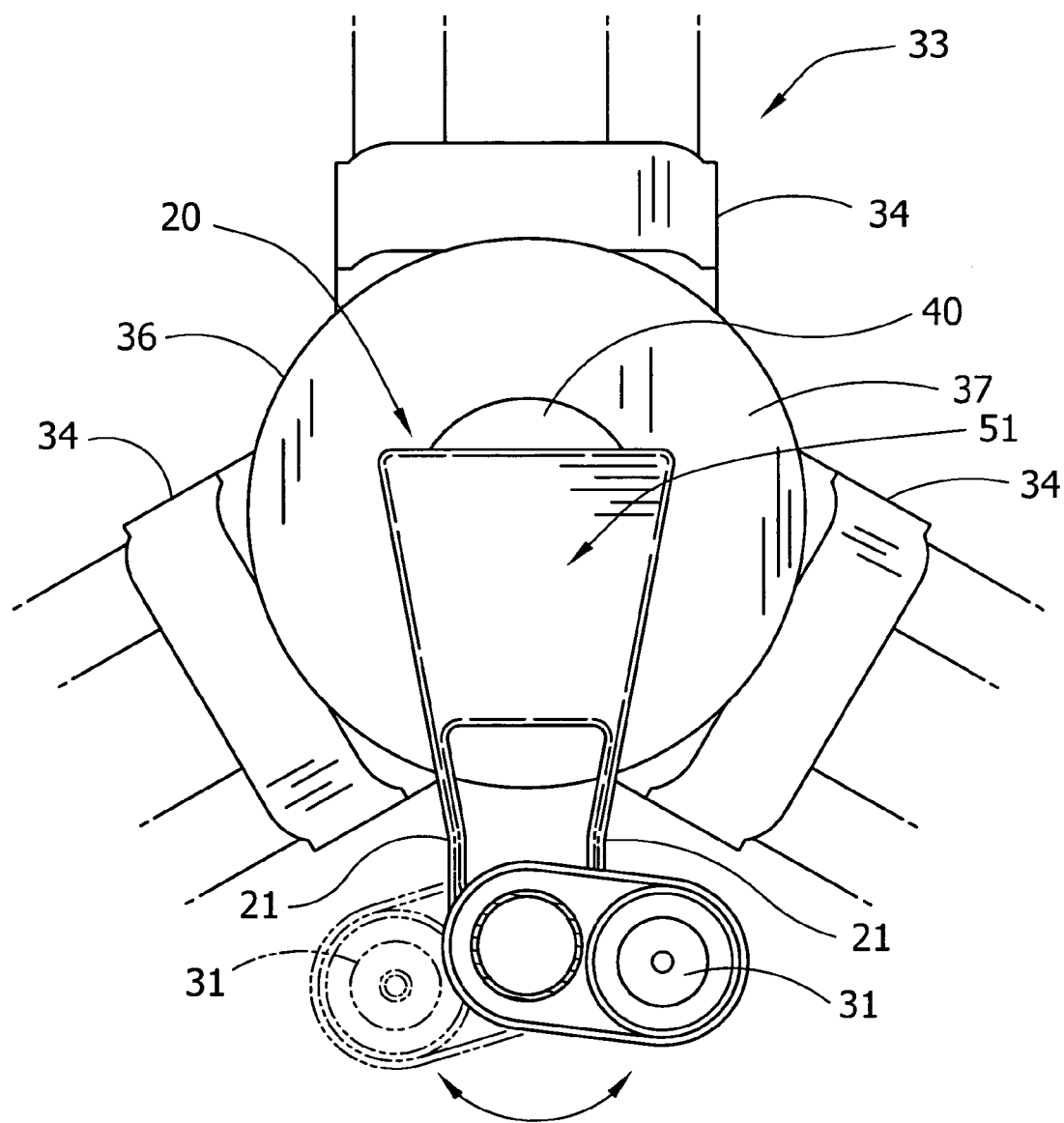
FIG. 6 is a section taken along line 6-6 of FIG. 3 illustrating rotational movement of a level indication vial about the pole in phantom.

In another mode of use, the support 20 provides a simple and accepted method of verifying the calibration of the level vial 31 as illustrated in FIG. 6. In practice, the accurate positioning of the target (i.e., retroprism 30) is dependant on the calibration of the level indication vial 31 mounted on the geomatics pole 29. The calibration of the level vial 31 should be confirmed immediately prior to each use because harsh field conditions may have rendered the vial inaccurate. Calibration of the level vial 31 can be verified using the support 20 by retaining the pole 29 vertically collimated and rotating it about its longitudinal axis relative to the support from a first position (shown in solid lines) to a second portion (shown in phantom). Calibration of the level vial 31 is possible since the pole support 20 of the present invention permits free rotation of the pole 29, while rigidly retaining it in vertical collimation.

Figure 7:
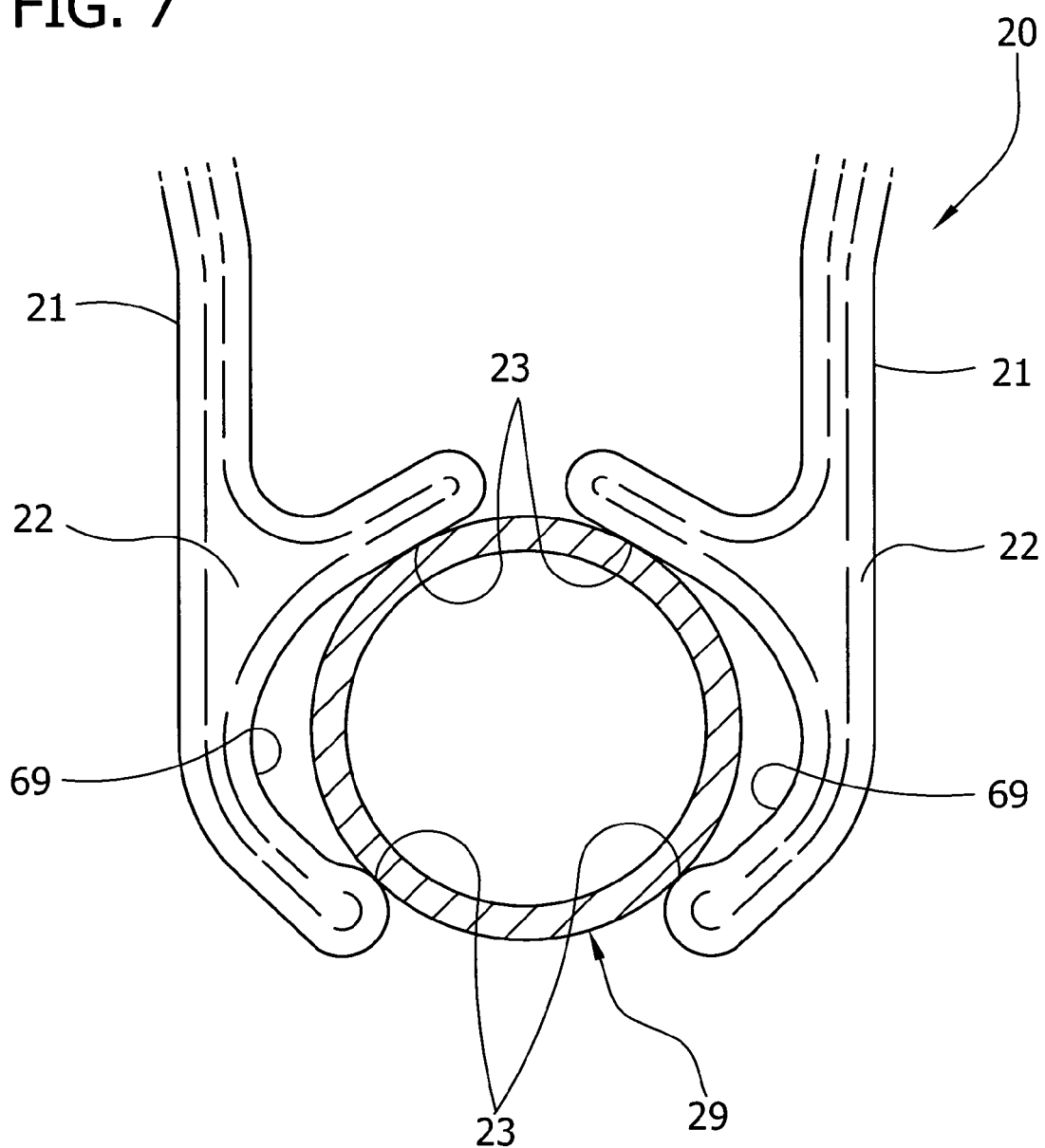
FIG. 7 is an enlarged fragment of FIG. 4 seen from the vantage indicated by line 7-7 of FIG. 4, illustrating pole support device jaws engaging the geomatics pole.

FIG. 7 provides a close up view of jaws 22, which facilitate free rotation of the pole 29 while providing rigid vertical support. The jaws 22 are forcibly urged against the geomatics pole 29 by a resilient spring action in the jaw supporting arms 21. In the illustrated embodiment, the resiliency is achieved by the material of the device 20. The points 23 on the surfaces of jaw 22 that engage the pole 29 limit sliding friction by minimizing the surface area in contact with the pole but provide sufficient contact to inhibit lateral movements of the pole relative to the support 20.

Figure 10:
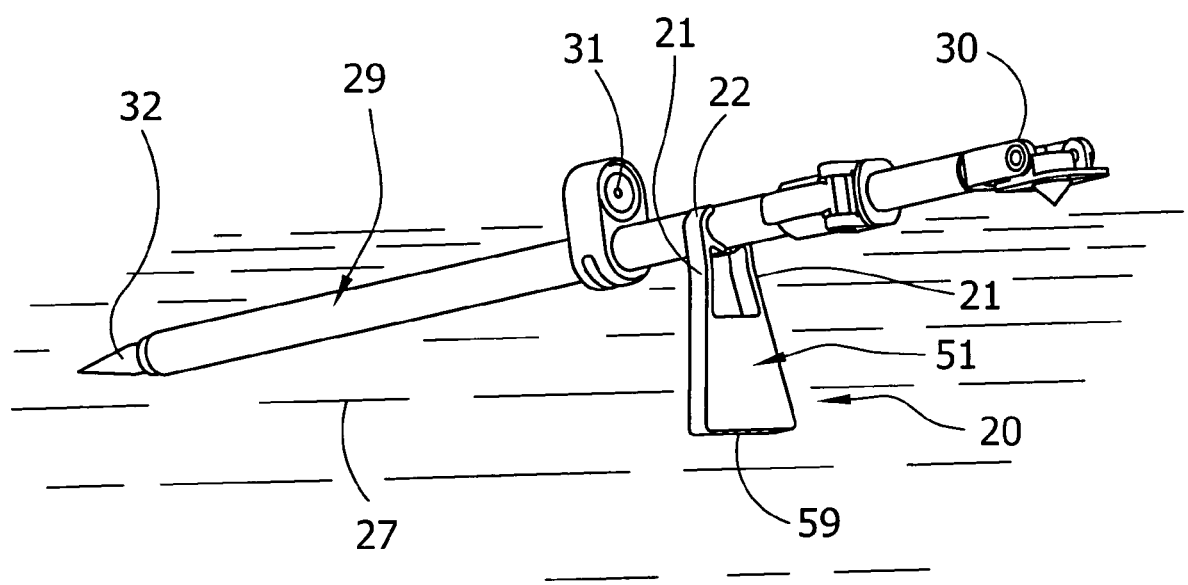
FIG. 10 is a perspective of the geomatics pole retained by the pole support device in a position substantially off the ground.

With reference to FIG. 9, the pole support 20 can be coupled to a geomatics pole 29 independent of the tripod 33 or other support. When mounted in this manner, the support 20 forms a rigid, perpendicular appendage to the pole 29 thereby providing another mode of use, i.e., as a ground surface standoff structure as illustrated in FIG. 10. When used in the ground standoff mode, the relatively wide back 59 (broadly, "ground engagement surface") of the pole support 20 acts as a support base, preventing the supported pole 29 from racking over and contacting the ground surface 27. Thus, the majority of the pole 29, the level vial 31, and the retroprism 30 are supported by the support 20 in a position above the ground surface 27. As mentioned above, the exposure of survey equipment (e.g., support pole 29, level vial 31, retroprism 30) to ground borne debris such as mud or sand can render the equipment inaccurate or even inoperable. As a result, the potential of the supported pole 29 becoming inoperable or otherwise compromised by ground contamination is significantly reduced. In addition, time spent cleaning the equipment is decreased.

In view of the above, it will be seen that the several objects of the invention are achieved and other advantageous results attained.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A geomatics pole support system comprising:

a supporting device comprising at least three legs, said device being capable of being erected on a ground surface in an upright position; and a pole support selectively connectable to the supporting device and adapted to selectively engage a geomatics pole, the pole support comprising a body extending between a first end and a second end opposite said first end, the pole support being adapted for supporting the geomatics pole in a first generally horizontal position wherein the pole support is disconnected from the supporting device and at least a portion of the second end of the body is in contact with the ground surface so the pole support extends generally vertically upward from the second end to the first end and at least a portion of the geomatics pole is held by the pole support in a stable position out of contact with the ground surface, and a second position wherein the pole support is connected to the supporting device so the pole support holds the geomatics pole in a substantially upright position, said body tappering to a narrower width from said second end to the first end.

2. The geomatics pole support as set forth in claim 1 wherein the pole support comprises arms extending from the first end of the body, and an engaging member mounted on each of the arms at a location remote from the body, the engaging members being adapted to grip the geomatics pole.

3. The geomatics pole support system as set forth in claim 2 wherein the engaging members are adapted for sliding along the length of the pole when connected to the pole.

4. The geomatics pole support system as set forth in claim 1 wherein the pole support is constructed for snap on connection to the pole.

5. The geomatics pole support as set forth in claim 1 wherein said supporting device comprises a tripod.

6. A geomatics pole in combination with a geomatics pole support, the geomatics pole having a longitudinal axis, the geomatics pole support being selectively connectable to a supporting device comprising at least three legs, the pole support comprising a body extending from a first end to a second end opposite said first end and pole engaging members at said first end adapted to connect the support to the geomatics pole so that the body is retained by the pole engaging members and projects generally laterally outward from the longitudinal axis of the pole from said first end to said second end, the body further including a terrain engagement surface at said second end adapted to engage a ground surface when the pole support is disconnected from the supporting device and to hold at least a portion of the pole in a stable position out of contact with the ground surface, the body tapering to a narrower width from the terrain engagement surface to the pole engaging members.

7. The combination as set forth in claim 6 wherein the terrain engagement surface is substantially flat.

8. The combination as set forth in claim 7 wherein the terrain engagement surface defines one side of the body.

9. The combination as set forth in claim 6 wherein the body is of one piece construction.

10. The combination as set forth in claim 9 wherein the body is formed from a polymeric material.

11. The combination as set forth in claim 10 wherein at least one pole engaging member is mounted on the body and resiliently biased to grip the pole.

12. The combination as set forth in claim 11 wherein at least one of the pole engaging members is mounted on the body for snap on connection to the pole.

13. The combination as set forth in claim 6 wherein the engaging members are constructed to engage the pole at least at three points.

14. The combination as set forth in claim 13 wherein the engaging members are adapted for sliding along the length of the pole when connected to the pole.

15. The combination as set forth in claim 14 wherein the engaging members each include a bulbous portion for engaging the geomatics pole at one of said three points.

16. The combination as set forth in claim 6 wherein the body further comprises a connector for connecting the body to the supporting device thereby positioning the pole support in a substantially horizontal position.

17. The combination as set forth in claim 16 in further combination with the supporting device, and wherein said supporting device comprises a tripod.

* * * * *